United States Patent
Kulkarni et al.

(10) Patent No.: US 9,267,635 B2
(45) Date of Patent: Feb. 23, 2016

(54) PIPELINE LINER MONITORING SYSTEM

(71) Applicants: Mohan G. Kulkarni, The Woodlands, TX (US); Timothy D. Anderson, Houston, TX (US)

(72) Inventors: Mohan G. Kulkarni, The Woodlands, TX (US); Timothy D. Anderson, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 120 days.

(21) Appl. No.: 14/180,269

(22) Filed: Feb. 13, 2014

(65) Prior Publication Data

US 2014/0251480 A1  Sep. 11, 2014

Related U.S. Application Data

(60) Provisional application No. 61/776,623, filed on Mar. 11, 2013.

(51) Int. Cl.
| | |
|---|---|
| F16L 55/16 | (2006.01) |
| F16L 9/00 | (2006.01) |
| F16L 55/18 | (2006.01) |
| B29C 63/34 | (2006.01) |

(52) U.S. Cl.
CPC ............... *F16L 55/18* (2013.01); *B29C 63/34* (2013.01); *Y10T 29/49826* (2015.01); *Y10T 29/53* (2015.01)

(58) Field of Classification Search
CPC ......... F16L 7/00; F16L 55/1656; F16L 11/12; Y10S 138/02; G01M 2/165
USPC ................ 138/98, 97, 108, 148, 172, DIG. 2; 156/287, 36.17; 405/184.2
See application file for complete search history.

(56) References Cited

U.S. PATENT DOCUMENTS

| | | |
|---|---|---|
| 2,502,638 A | 4/1950 | Becht |
| 2,979,431 A | 4/1961 | Perrault |
| 3,894,328 A | 7/1975 | Jansson |
| 3,905,853 A | 9/1975 | Stent |
| 4,000,759 A | 1/1977 | Higbee |
| 4,064,211 A | 12/1977 | Wood |
| 4,207,130 A | 6/1980 | Barber |
| 4,386,628 A | 6/1983 | Stanley |

(Continued)

FOREIGN PATENT DOCUMENTS

| | | |
|---|---|---|
| EP | 1 920 913 A1 | 5/2008 |
| GB | 2 193 463 A | 2/1988 |

(Continued)

OTHER PUBLICATIONS

Smith, B. et al., "Fiber-Reinforced Polymer Pipelines for Hydrogen Delivery", DOE Hydrogen Program, 2007 Annual Progress Report, pp. 319-322.

(Continued)

*Primary Examiner* — Patrick F Brinson
(74) *Attorney, Agent, or Firm* — ExxonMobil Upstream Research-Law Department

(57) ABSTRACT

A pipeline monitoring system and systems and methods of producing the same. A system for producing a liner for a pipe can comprise a source of material to form a body of the liner and a source of material to form a monitoring sensor in the liner. The system may further comprise a device that receives the material to form the body of the liner and the material to form the monitoring sensor in the liner and produces the body of the liner with the monitoring sensor embedded within the body of the liner.

26 Claims, 4 Drawing Sheets

(56) References Cited

U.S. PATENT DOCUMENTS

| | | | |
|---|---|---|---|
| 4,496,499 A | 1/1985 | Brittain et al. | |
| 4,827,553 A | 5/1989 | Turpin, Sr. et al. | |
| 4,863,365 A | 9/1989 | Ledoux et al. | |
| 4,985,196 A | 1/1991 | LeDoux et al. | |
| 4,998,871 A | 3/1991 | Ledoux | |
| 5,006,291 A | 4/1991 | Fish | |
| 5,072,622 A | 12/1991 | Roach et al. | |
| 5,091,137 A | 2/1992 | Ledoux | |
| 5,114,634 A | 5/1992 | McMillan et al. | |
| 5,256,342 A | 10/1993 | McMillan et al. | |
| 5,358,680 A | 10/1994 | Boissannat et al. | |
| 5,366,773 A | 11/1994 | Schroll et al. | |
| 5,546,992 A * | 8/1996 | Chick et al. | 138/98 |
| 5,551,484 A * | 9/1996 | Charboneau | 138/104 |
| 5,649,568 A | 7/1997 | Allen et al. | |
| 6,058,978 A | 5/2000 | Paletta et al. | |
| 6,098,667 A | 8/2000 | Odru | |
| 6,240,612 B1 | 6/2001 | McGuire | |
| 6,305,427 B1 * | 10/2001 | Priest, II | 138/125 |
| 6,723,266 B1 * | 4/2004 | Lippiatt | 264/173.17 |
| 6,923,217 B2 | 8/2005 | Smith | |
| 6,932,116 B2 | 8/2005 | Smith et al. | |
| 6,935,376 B1 * | 8/2005 | Taylor et al. | 138/98 |
| 6,940,054 B1 | 9/2005 | Heggdal | |
| 7,000,646 B2 | 2/2006 | Mestemacher | |
| 7,025,580 B2 * | 4/2006 | Heagy et al. | 425/11 |
| 7,374,127 B2 | 5/2008 | Gallagher et al. | |
| 7,381,454 B1 | 6/2008 | Kirjavainen et al. | |
| 8,567,450 B2 | 10/2013 | Sringfellow et al. | |
| 2003/0113489 A1 * | 6/2003 | Smith | 428/34.5 |
| 2005/0283276 A1 | 12/2005 | Prescott et al. | |
| 2006/0229395 A1 | 10/2006 | Hsu et al. | |
| 2007/0113971 A1 | 5/2007 | Driver et al. | |
| 2007/0125301 A1 | 6/2007 | Zhou et al. | |
| 2007/0132865 A1 | 6/2007 | Adams, Jr. et al. | |
| 2007/0209726 A1 | 9/2007 | Driver et al. | |
| 2007/0267785 A1 | 11/2007 | Bellamy et al. | |
| 2009/0092173 A1 | 4/2009 | Glombitza | |
| 2009/0205733 A1 * | 8/2009 | Stringfellow et al. | 138/104 |
| 2010/0229662 A1 | 9/2010 | Brower | |
| 2011/0030875 A1 | 2/2011 | Conte et al. | |
| 2011/0185807 A1 | 8/2011 | Albrecht et al. | |
| 2012/0031620 A1 * | 2/2012 | Phadke | E21B 17/01 166/336 |

FOREIGN PATENT DOCUMENTS

| | | |
|---|---|---|
| JP | 61-123527 A | 6/1986 |
| WO | WO 00/70256 | 11/2000 |

OTHER PUBLICATIONS

Anderson, T. D. et al., "Reinforced Liners for Long-Distance Pipeline Rehabilitation", Proceedings of the Twenty-second (2012) International Offshore and Polar Engineering Conference, Jun. 17-22, 2012, pp. 395-400, Rhodes, Greece.

* cited by examiner

PIPELINE LINER MONITORING SYSTEM

CROSS REFERENCE TO RELATED APPLICATIONS

This application claims the benefit of U.S. Provisional Patent Application No. 61/776,623 filed Mar. 11, 2013, and is incorporated herein by reference.

FIELD OF INVENTION

This invention generally relates to the field of pipeline liners and, more particularly, to a system for monitoring pipeline liners by embedding sensors into the liner and methods of producing and deploying the same.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Most pipelines used for the transportation of oil, gas, water, or mixtures of these fluids, are constructed from carbon steel. Carbon steel is a desirable material due to its availability, low cost relative to other materials, strength, toughness and ability to be welded. However, carbon steels can be corroded by many of the fluids contacting them. Almost all carbon steel pipelines have some level of corrosion of their internal surface and large costs are expended in the monitoring of corrosion, injecting chemicals into the pipeline to inhibit corrosion, and inspection of the pipeline.

Even with these mitigating activities, significant corrosion can occur, causing reduction of the pipe wall thickness, typically in uneven channels or pits. The corrosion can extend along long segments of a pipeline or may be only in localized areas. Furthermore, the corrosion may grow through the pipeline wall resulting in small leaks. These leaks are typically repaired by applying an external clamp around the pipeline. At times the corrosion can be so extensive that external clamps are ineffective and segments of the pipeline are replaced at high cost, often causing long term deferred production of hydrocarbons.

Pipeline liners have been used to provide a barrier against the deleterious effects of internal corrosion on pipelines. The plastic materials of the pipeline liners are placed in direct contact with the transported fluids instead of the steel pipeline. The liners exhibit superior corrosion resistance, yet provide a cost-effective alternative to pipeline replacement or the use of corrosion-resistant alloys. Additionally, remediation of a deteriorated pipeline with a pipeline liner can allow restoration of the full pressure rating of the pipe.

The market for liners is mature to the point that several competing technologies are available. Several types of liners are intended for use in the water-transport and sanitation markets, providing short-length rehabilitation within the pipeline. The vast networks of pipelines in the oil and gas industry have facilitated the development of several long distance pipeline liner options.

Types of long distance pipeline liners include thermoplastic liners and composite liners. Both thermoplastic and composite liners provide corrosion resistance when installed, but the variations in mechanical properties make each of them attractive for particular applications.

Thermoplastic liners, which are the more simple form of pipeline liners, are composed entirely of polymeric, or plastic, material. The most commonly used polymer in pipeline liner applications is High-Density Polyethylene (HDPE), due to its low cost, availability, and range of service conditions. Alternative plastics may also be selected for their enhanced strength or high-temperature service capabilities. These thermoplastic materials have excellent formability and advantageous material properties. Thermoplastic liners are generally not strong enough to withstand long pull lengths or independently withstand the full range of operating pressures prevalent in the hydrocarbon production industry.

Thermoplastic feedstock can easily be extruded into continuous tubular forms. Precise dimensional control allows the liner to conform to the host pipe. The pipeline liner can be reeled for delivery if it has a small diameter, or the liner segments can be fusion welded on-site. Insertion of the liner, or slip-lining, often necessitates that the plastic liner have a temporary size reduction in order to easily traverse within the host pipeline.

Thermoplastic properties allow several options for this size reduction, including roller reduction and folding of the tube into a smaller diameter. In service, the host pipe is still relied upon for pressure containment, but the strength of thermoplastics does allow bridging of small gaps, pits, or pinholes. However, the relatively low range of mechanical strength properties of thermoplastic liners does impose other limitations. The low longitudinal strength limits the pulling length, as the liner will tear under its own weight and the frictional drag that arises during slip-lining. It also limits the available host pipe geometries; typical minimum bend radii are on the order of 50 pipe diameters.

Composite liners are another major category of pipeline liners. Composite liners have been developed to expand the range of conditions in which liners may be applied. The cost of composite liners may prohibit their use in remediation projects if the full extent of their properties is not necessary, such as a short pipe that is still capable of pressure containment.

Currently available composite liners are manufactured in a multi-step process in which successive layers are wrapped around a plastic core pipe. In this way, the corrosion resistance of thermoplastics can be combined with the mechanical properties afforded by reinforcing materials such as glass fiber, metallic cables or wires, carbon fiber, ultra-high molecular weight polyethylene (UHMWPE), or nylon. The complexity of these systems necessitates more tooling and results in a greater cost per unit length over plastic liners, but the superior mechanical properties grant the tubing sufficient hoop strength for pressure-containment. In many cases, the host pipe only serves as a conduit for running the composite liner, which then acts as a self-sufficient pipeline. Many composite liners available in the market today were initially designed as stand-alone flexible pipe. The complex fabrication of these composites typically requires that they be manufactured in a facility and then delivered to the installation site on a spool. The size of spools which can be delivered onshore can limit composite liners to small (<6") diameters.

Like thermoplastic liners, composite pipe liners are installed via slip-lining. The high strength properties allow much longer insertions. The high strength also permits composite liners to negotiate sharper bends in the host pipe. Some known composite liners permit a minimum bend radius as low as nine (9) pipe diameters.

One specific known composite pipeline liners employs an inner HDPE pipe wrapped in various layers of reinforcement. This liner was originally conceived to overcome some of the challenges inherent in the lining process by fabricating the composite in the field. The portable factory removes the length limitations that reeling imposes on length (up to 10 miles), and allows for significantly larger diameter pipelines to be lined. In general, existing liner technologies have not been shown to overcome the issue of severe bends (three to five diameters) in the host pipeline.

As noted above, the insertion of such pipeline liners typically involves slip-lining the liner within an existing host pipe. Unfortunately, this process may result in local damage on the liner. Once inserted into the host pipe, it is often extremely difficult, if not impossible, to locate the damage on the liner. After the pipeline liner is installed, the commissioning process often involves a hydro-test in which the liner and host pipe are filled with water at high pressure and are tested for leaks. In the event that leaks are identified, the leaking section or portion of the liner is repaired or replaced. However, identifying the existence of leaks and/or locating such leaks are challenging processes.

Further, because the pipeline liners are primarily constructed of plastic (or derivative) materials, it is not possible to use conventional in-line inspection (ILI) tools. As a result, it also becomes difficult to understand the structural integrity of the liner and pipeline during operations. Because pipeline liners are typically installed in old pipelines in need of rehabilitation, integrity monitoring of such pipes is critical.

Thus, there is a need for improvement in this field.

SUMMARY OF THE INVENTION

Embodiments of the present disclosure provide a system and method of monitoring the condition of a pipeline and/or pipeline liner. Other embodiments relate to systems and methods for producing a self-monitoring pipeline liner for an existing pipeline.

One embodiment of the present disclosure is a system for producing a liner for a pipe, the system comprising a source of material to form a body of the liner; a source of material to form a monitoring sensor in the liner; and a device that receives the material to form the body of the liner and the material to form the monitoring sensor in the liner and produces the body of the liner with the monitoring sensor embedded within the body of the liner.

The foregoing has broadly outlined the features of one embodiment of the present disclosure in order that the detailed description that follows may be better understood. Additional features and embodiments will also be described herein.

BRIEF DESCRIPTION OF THE DRAWINGS

The present innovation and its advantages will be better understood by referring to the following detailed description and the attached drawings.

Figure 1:
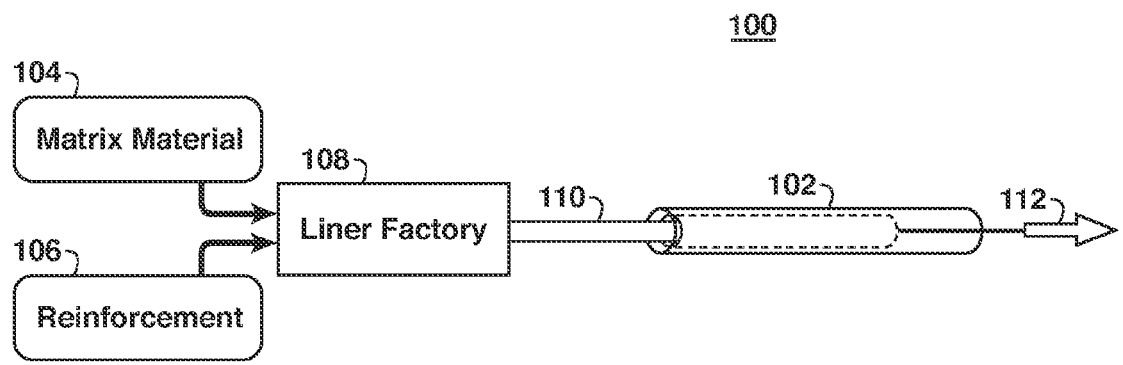
FIG. 1 is a diagram showing a system of providing a liner for a pipe according to one embodiment of the present disclosure.

It should be noted that the figures are merely examples of several embodiments of the present invention and no limitations on the scope of the present invention are intended thereby. Further, the figures are generally not drawn to scale, but are drafted for purposes of convenience and clarity in illustrating various aspects of certain embodiments of the invention.

DESCRIPTION OF THE SELECTED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. Some embodiments of the invention is shown in great detail, although it will be apparent to those skilled in the relevant art that some features that are not relevant to the present invention may not be shown for the sake of clarity.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent.

One embodiment of the present disclosure relates to a system and method for inserting a polymeric liner into an existing pipeline to separate corrosive fluid running through the inside of the pipeline from the inside wall of the pipeline in order to prevent or reduce further corrosion. The liner may bridge small holes in the steel pipeline wall, thus stopping small leaks. In addition, a liner according to the present disclosure may be installed in older pipelines that have corrosion damage, or in new pipelines to prevent corrosion damage. It is desirable for the pipeline to have sufficient structural strength to support the lining.

There are many possible applications for liners that necessitate properties beyond that of thermoplastics but do not demand the elevated properties or cost of composites. A simplified form of composite that provides the service characteristics of a thermoplastic with the installation options possible with current composites would greatly expand the opportunities for liners in the marketplace. Reinforcing materials may be used to attain greater pull lengths and to overcome tight bends in the host pipe that restrict current liner installation. In service, however, a liner according to the present disclosure has properties similar to a thermoplastic by providing a barrier against further corrosive attack on the host pipe. In this way, a liner according to the present disclosure may improve performance/cost ratio relative to known technologies. Further cost-savings may be available by incorporating matrix material and reinforcement material into a liner in a single manufacturing step, thus reducing the necessary tooling, footprint, and manpower.

FIG. 1 is a diagram showing a system 100 of providing a liner for a host pipe 102 according to one embodiment of the present disclosure. A matrix material source 104 provides matrix material to the liner manufacturing equipment, herein referred to as the liner factory 108. Simultaneously, a reinforcement material source 106 provides reinforcement material to the liner factory 108. As explained herein, the liner factory 108 combines matrix material from the matrix material source 104 with reinforcement material from the reinforcement material source 106 to produce a pipeline liner 110.

As explained herein, the pipeline liner 110 may comprise a body portion produced from the matrix material. The pipeline liner 110 additionally comprises a reinforcing structure produced from the reinforcement material. The liner factory 108 is an example of a device that simultaneously receives the material to form the body portion of the liner (the matrix material) and the material to form the reinforcement structure (the reinforcement material) in the liner. The liner factory 108 then produces the body of the liner with the reinforcement structure interspersed within the body of the liner in a continuous single-step process.

In the example shown in FIG. 1, the pipeline liner 110 may be pulled through an existing host pipe 102 by a pulling device 112 as it is produced. In this manner, the matrix material and the reinforcement material needed to produce the pipeline liner 110 may be efficiently transported to the site of the host pipe 102. Moreover, the pipeline liner 110 may be produced in one manufacturing operation at the site of the host pipe 102.

According to the present disclosure, the pipeline liner 110 provides a cost-effective lining for a long-distance pipeline for the purpose of remediation. An exemplary embodiment combines desirable attributes of thermoplastic and composite liners described herein in order to maximize the longitudinal strength of the liner with a single-step manufacturing process. The pipeline liner 110, which is a composite liner, is produced in a manner similar to a plastic pipe or liner, but reinforcement material is simultaneously included in the same process.

Figure 2:
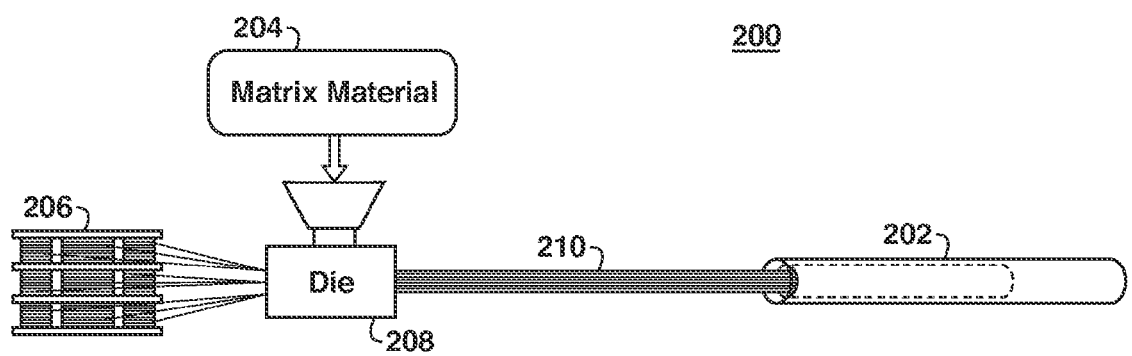
FIG. 2 is a diagram showing a system for providing a liner for a pipe using fiber pultrusion according to one embodiment of the present disclosure.
Figure 3:
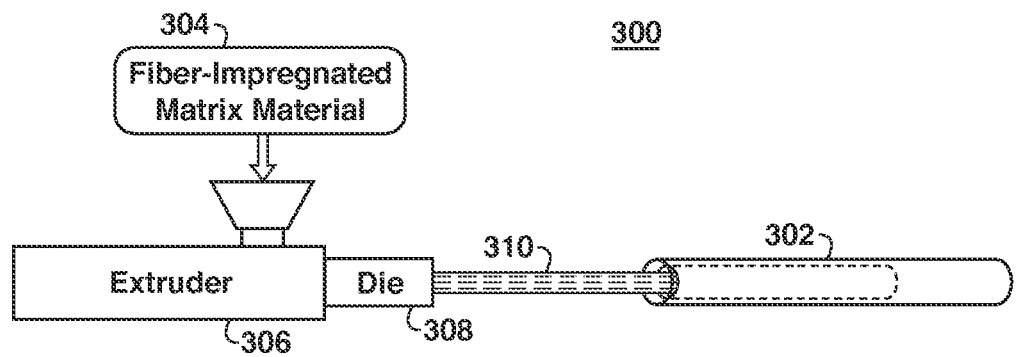
FIG. 3 is a diagram showing a system for providing a liner for a pipe using long-fiber co-extrusion according to one embodiment of the present disclosure.
Figure 4:
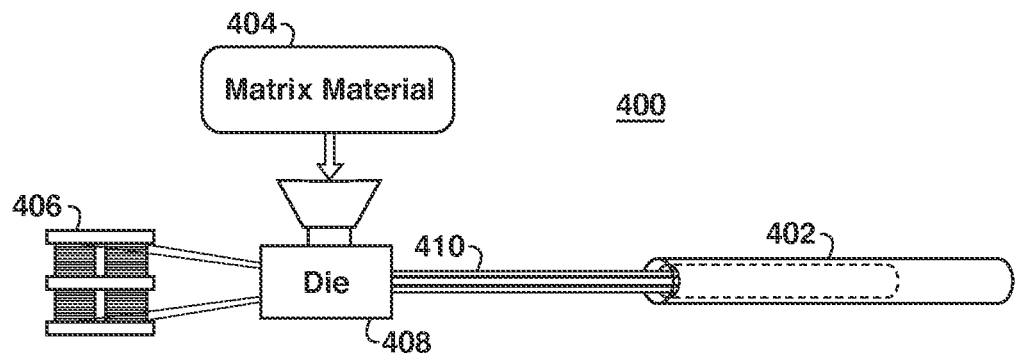
FIG. 4 is a diagram showing a system for providing a liner for a pipe using tape pultrusion according to one embodiment of the present disclosure.

FIGS. 2-4 provide specific examples of different fabrication techniques that may be employed according to embodiments of the present disclosure. The examples shown in FIG. 2 (pultrusion) and FIG. 3 (co-extrusion) promote longitudinal orientation for the reinforcing material, which maximizes its contribution to the tensile strength of the liner. Efficient use of the reinforcing material is an important aspect the design of the pipeline liner of the present disclosure, as the cost of reinforcing material can be several times greater than the composite matrix material. The large increase in tensile strength caused by reinforcing materials permits longer pulling distances, as the pipeline liner can now withstand more frictional drag during slip-lining installation. One example of reinforcing material that may be used is fiber. Examples of material types that may be used to provide fiber reinforcement according to the present disclosure include glass fiber, metallic cables or wires, carbon fiber, ultra-high molecular weight polyethylene (UHMWPE), and nylon, among others. However, pre-preg tapes or strips composed in part by these materials could also be used to confer axial strength during installation, as described herein with reference to the example shown in FIG. 4.

A pipeline liner according to the present disclosure may provide advantages relative to known pipeline liners. First, the longer pulling distance reduces the number of incursions that are typically made when remediating long-distance pipelines. Because greater distances can now be lined in a single slip-lining operation, more pipelines than ever before could be amenable to remediation by lining. For instance, some pipelines can no longer be accessed easily because of structures and/or populations that have since accumulated over them. The improved tensile strength of the pipeline liner of the present disclosure would increase the range of pipeline geometries open to slip-lining, since a stronger liner could more easily negotiate pipelines with bends in their length.

A single-step manufacturing process according to embodiments of the present disclosure also improves the portability of the process over known composite-type pipeline liners. The use of a portable factory as described herein simplifies the case of in-field fabrication. Space considerations for a long-distance slip-lining operation become difficult if the entire length of liner is to be delivered in whole to the worksite. In-field fabrication according to embodiments of the present disclosure allows for relatively efficient delivery of the raw materials and the factory itself to the work-site, without transporting a completed pipeline liner to the work-site. The continuous manufacturing method also eliminates the necessity of a joining process to produce the long-distance liner.

Like the thermoplastic liners described herein, a pipeline liner according to embodiments of the present disclosure may provide the hoop strength of the host pipeline during service by assuming a tight fit along the inner pipe surface. The use of reinforcements aligned circumferentially in order to impart hoop strength to the liner can therefore be omitted, reducing the overall material cost. However, if the integrity of the host pipeline could not be assured, the present disclosure permits the addition of spirally-wound reinforcements in a subsequent manufacturing step. The pipeline liner would then be lent a pressure-carrying capacity.

FIG. 2 is a diagram showing a system 200 for providing a liner for a pipe using fiber pultrusion according to an embodiment of the present disclosure. A matrix material source 204 provides matrix material to a forming die 208. Simultaneously, a number of fiber reels 206 provide fiber reinforcement material to the die 208. As explained herein, the die 208 combines matrix material from the matrix material source 204 with fiber reinforcement material from the fiber reels 206 using a process of fiber pultrusion to produce a pipeline liner 210. The pipeline liner 210 may then be deployed within a host pipe 202, as fully set forth herein.

Carbon fibers are examples of strong fibers that are readily available for use in the system 200. Carbon fibers possess tensile strengths on the order of giga-pascals, which is several orders of magnitude greater than the strength of thermoplastic materials. An exemplary method for using carbon fibers efficiently is to make them continuous along the length of the liner. The pultrusion manufacturing process performed by the system 200 is capable of delivering a tubular composite with continuous fibers. In an exemplary process of pultrusion, fibers are unwound from the fiber reels 206 and passed through a container of liquefied matrix material. The wetted fibers then pass through the forming die 208, which defines the shape of the resultant composite material. Since the fibers are being pulled, they will tend to maintain a longitudinal orientation. The longitudinal orientation of the fibers maximizes their contribution to axial strength, potentially reducing the overall amount of fibers needed and further reducing the material costs.

FIG. 3 is a diagram showing a system 300 for providing a liner for a pipe using long-fiber thermoplastic extrusion (LFT) according to an embodiment of the present disclosure. LFT provides a relatively large degree of control over the extrusion process. In this manner, fibers emerge from a die in significantly greater lengths. The tensile strength of the resulting pipeline liner is thus considerably improved.

In the example shown in FIG. 3, a fiber-impregnated matrix material source 304 is delivered to an extruder 306. The extruder 306 delivers processed fiber-impregnated matrix material to a die 308. The die 308 then produces a composite liner 310 that includes fiber reinforcement. The composite liner 310 may be deployed into a host pipe 302 as explained herein.

FIG. 4 is a diagram showing a system 400 for providing a liner for a pipe using tape pultrusion according to an embodiment of the present disclosure. A matrix material source 404 provides matrix material to a die 408. Simultaneously, a number of pre-impregnated tape reels 406 provide reinforcement material to the die 408. As explained herein, the die 408 combines matrix material from the matrix material source 404 with reinforcement material from the pre-impregnated tape reels 406 using a process of tape pultrusion to produce a composite pipeline liner 410. The pipeline liner 410 may then be deployed within a host pipe 402, as fully set forth herein.

Figure 5:
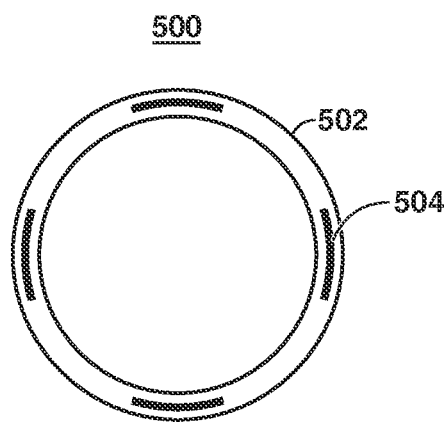
FIG. 5 is a cross-section of a pipeline liner produced via tape pultrusion according to one embodiment of the present disclosure.

FIG. 5 is a cross-section of a pipeline liner 500 produced via tape pultrusion according to an embodiment of the present disclosure. The pipeline liner 500 comprises a body portion 502 of matrix material. At various points around the circumference of the body portion 502, reinforcement structures 504 in the form of tape elements are deployed. The reinforcement structures 504 provide axial strength for the body portion 502.

Unlike known liner technologies, a pipeline liner according to the present disclosure may provide the ability to remediate relatively long-distance pipelines from a single access point using low-cost materials. Such an improvement is useful in the energy industry, which employs pipeline assets of significantly greater scale than, for example, the utility industry.

In addition, a manufacturing process according to the present disclosure may provide the ability to produce a tubular composite with a thermoplastic matrix and longitudinal reinforcement. With respect to composite materials, the amount of strengthening provided by a reinforcing material is a function of the length of the reinforcing material. An exemplary manufacturing process facilitates the inclusion of reinforcing material in sufficiently long lengths to make hydrocarbon industry pipeline remediation feasible. Moreover, the manufacturing process does not break the fibers up into pieces so small that they provide relatively little in the way of strength reinforcement.

Embodiments of the present disclosure may be used to provide a pipeline liner having a relatively high ratio of desirable qualities to cost. Some techniques to maximize this ratio include the use of the most effective materials in the most efficient quantities. Thermoplastic matrix materials are available in many forms, with a variety of costs and strength properties. Because an exemplary pipeline liner according to the present disclosure relies on the host pipeline for pressure containment, it may not be necessary to select a high-strength matrix that would incur greater costs. A simple and inexpensive thermoplastic like HDPE may be sufficient. Moreover, HDPE is known to be capable of maintaining pressure over small gaps or pores in the host pipeline. HDPE further serves as an excellent barrier to prevent internal pipeline corrosion.

Exemplary embodiments of the present disclosure combine a continuous manufacturing process with compatible materials. When a pipeline liner according to the present disclosure is manufactured in one continuous process, the materials used in the pipeline liner are desirably compatible with the manufacturing technique and able to provide the necessary properties for installation and operation. Reinforcing material such as fibers are desirably selected to withstand the pulling forces for installation, while the thermoplastic matrix is chosen to serve as a sufficient barrier to corrosive fluids.

Figure 6:
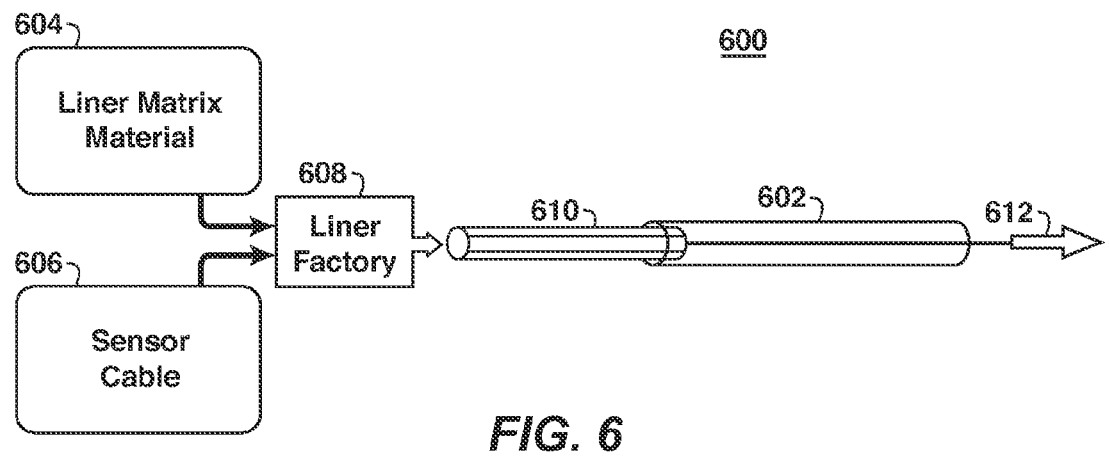
FIG. 6 is a diagram showing a system of providing a liner for a pipe containing embedded sensor cable according to one embodiment of the present disclosure.

FIG. 6 is a diagram showing a system 600 of providing a liner for a host pipe 606 containing embedded sensor cable according to one embodiment of the present disclosure. A matrix material source 604 provides matrix material to the liner manufacturing equipment, depicted in the FIG. 6 embodiment as a liner factory 608. Simultaneously, a monitoring sensor source 606 provides sensor cable to the liner factory 608. As explained herein, the liner factory 608 combines matrix material from the matrix material source 604 with sensor cable from the monitoring sensor source 606 to produce a pipeline liner 610.

As explained herein, the pipeline liner 610 may comprise a body portion produced from the matrix material. The pipeline liner 610 additionally comprises a monitoring sensor produced from the sensor material or sensor cable. The liner factory 608 is an example of a device that simultaneously receives the material to form the body portion of the liner (the matrix material) and the material to form the monitoring sensor (the sensor material) in the liner. The liner factory 608 then produces the body of the liner with the monitoring sensor embedded within the body of the liner in a continuous single-step process.

In the example shown in FIG. 6, the pipeline liner 610 may be pulled through an existing host pipe 602 by a pulling device 612 as it is produced. In this manner, the matrix material and the sensor material needed to produce the pipeline liner 610 may be efficiently transported to the site of the host pipe 602. Moreover, the pipeline liner 610 may be produced in one manufacturing operation at the site of the host pipe 602. In some embodiments, liner factory 608 may produce the body of the liner with a monitoring sensor and a reinforcement structure. The reinforcement structure may be interspersed or embedded into the liner as disclosed herein.

According to embodiments of the present disclosure, installation of a self-monitoring pipeline liner 610 provides an ability to understand several parameters of interest, such as, but not limited to, temperature, pressure, and acoustic vibrations, that can indicate condition of the liner and the pipeline. Further, installation of embodiments of pipeline liner 610 in unpiggable pipelines allow for the inspection and monitoring of pipelines which were previously incapable of efficiently being inspected and/or monitored.

In embodiments of the present disclosure, the material to form a monitoring sensor may be a fiber optic cable. As appreciated by those skilled in the art, the operation of optical fibers as embedded monitoring sensors is based on backscattering of light from all locations along the fiber. In some embodiments, the fiber optic sensors are capable of providing micron strain resolutions less than 10 microns and/or approximately 1° C. temperature resolution over long distances, such as, but not limited to, 40 km. However, as appreciated by those skilled in the art, other resolutions and distances capabilities may also be possible.

By analyzing the characteristics of the backscattered light, the presence and location of an event in the longitudinal direction along the fiber can be detected. The use of optical sensors provides a variety of monitoring capabilities pertaining to the physical condition or characteristics of the pipeline and/or pipeline liner. In some embodiments, the embedded monitoring sensor is constructed and arranged to monitor strain in liner material. The detection of liner strain is helpful in understanding the damage caused to the liner during installation and/or assist in identifying the location of leaks within the liner during commissioning. In further embodiments, strain in pipeline and liner during operations may be monitored. Pipeline and liner strain information may be helpful in geographical locations that may induce large strains on the pipeline due to seismic events or permafrost, to name a couple non-limiting examples.

In some embodiments, the embedded monitoring sensor is constructed and arranged to monitor liner temperature. The detection of liner temperature may help to identify and/or locate leaks within the liner during commissioning and operations. The detection of liner temperature may also assist in the identification of potential detect flow assurance issues during operations, such as, but not limited to, monitoring conditions that may lead to hydrates, waxing issues.

In some embodiments, the embedded monitoring sensor is constructed and arranged to monitor acoustic vibrations within the liner. Acoustic vibration information may help to monitor leaks within the pipeline during commissioning and operations, potential free span vibrations and flow assurance issues. In some embodiments, the embedded monitoring sensor may be constructed and arranged to monitor a variety of other physical conditions of the liner or pipeline, such as, but not limited to, pressure. In some embodiments, the embedded sensor is capable of monitoring a plurality of physical conditions.

Figure 7:
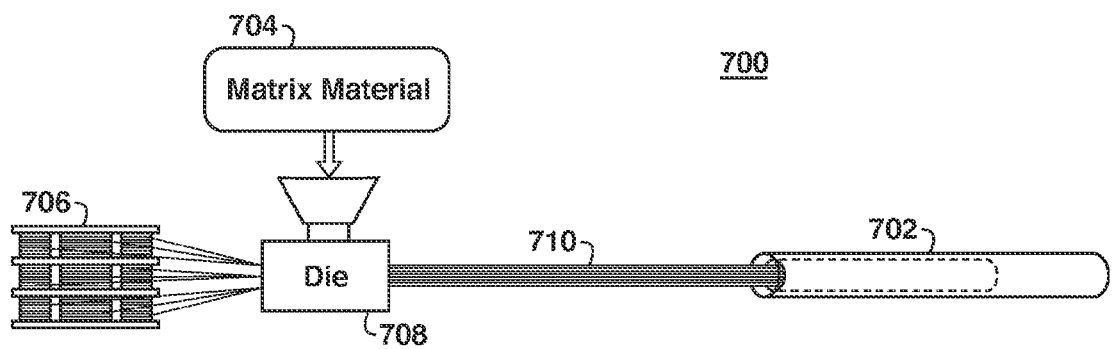
FIG. 7 is a diagram showing a system for providing a liner for a pipe containing embedded sensor cable using fiber pultrusion according to one embodiment of the present disclosure.

FIG. 7 provides a specific example of a different fabrication technique that may be employed according to embodiments of the present disclosure. FIG. 7 is a diagram showing a system 700 for providing a liner for a host pipe 704 containing embedded sensor cable using pultrusion according to one embodiment of the present disclosure. A matrix material source 704 provides matrix material to a forming die 708. Simultaneously, a number of sensor cable reels 706 provide monitoring sensor material to the die 708. As explained herein, the die 708 combines matrix material from the matrix material source 704 with monitoring sensor material from the sensor cable reels 706 using a process of pultrusion to produce a pipeline liner 710. The pipeline liner 710 may then be deployed within a host pipe 702, as fully set forth herein.

An exemplary method for using fiber optic cable efficiently is to make them continuous along the length of the liner. The pultrusion manufacturing process performed by the system 700 is capable of delivering a tubular composite with continuous fibers or cables. In an exemplary process of pultrusion, cables are unwound from the sensor cable reels 706 and passed through a container of liquefied matrix material. The wetted cables then pass through the forming die 708, which defines the shape of the resultant composite material. Since the fiber optic cables are being pulled, they will tend to maintain a longitudinal orientation. In some embodiments, die 708 may also combine the matrix material source 704 and the sensor cable reels 706 along with a material to form a reinforcement structure.

Figure 8:
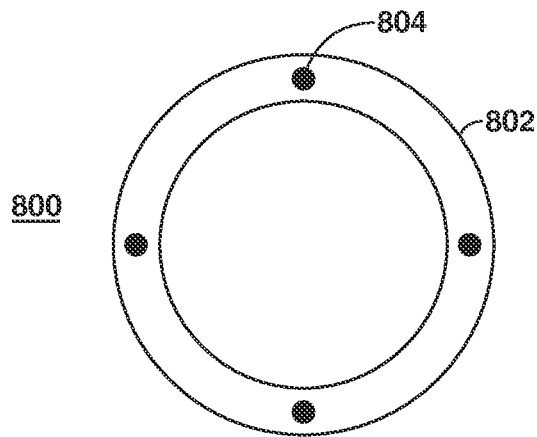
FIG. 8 is a cross-section of a pipeline liner with embedded sensor cables produced according to one embodiment of the present disclosure.

FIG. 8 is a cross-section of a pipeline liner 800 with embedded sensor cables produced according to embodiments of the present disclosure. The pipeline liner 800 comprises a body portion 802 of matrix material. At various points around the circumference of the body portion 802, monitoring sensors 804 are embedded. In some embodiments, the monitoring sensors 804 are selectively placed at critical monitoring locations in the circumferential direction. In the depicted embodiment, the body portion is composed of a single layer of matrix material. The layer of matrix material has an inner surface and an outer surface. The monitoring sensors are placed between the inner and outer surfaces of the layer. Though four monitoring sensors 804 are present in the FIG. 8 embodiment, other embodiments of the present disclosure may have fewer or more monitoring sensors 804 embedded within the body portion 802.

Figure 9:
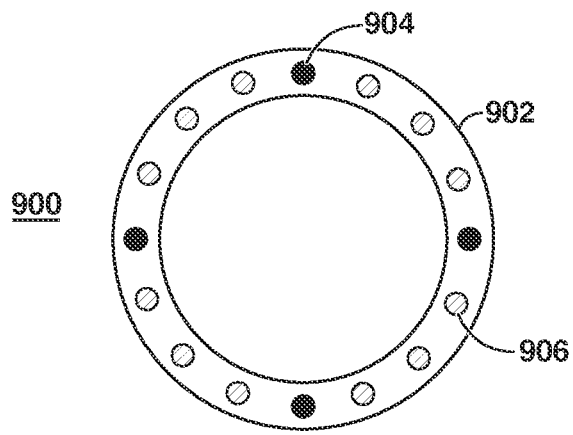
FIG. 9 is a cross-section of a pipeline liner with embedded sensor cables and reinforcement structures produced according to one embodiment of the present disclosure.

FIG. 9 is a cross-section of a pipeline liner 900 with embedded sensor cables and reinforcement structures produced according embodiments of present disclosure. The pipeline liner 900 comprises a body portion 902 of matrix material. Like the FIG. 8 embodiment, monitoring sensors 904 are embedded at various points around the circumference of the body portion 902. Unlike the FIG. 8 embodiment, pipeline liner 900 also has multiple reinforcement structures 906 embedded within the body portion 902. As disclosed herein, the reinforcement structures may take a variety of forms, such as, but not limited to, glass rods, carbon rods, and steel cables. The reinforcement structures provide axial strength for the body portion. Increasing the axial strength of the body portion in turn increases the ability to insert the liner into host pipe longer distances. In some embodiments, the sensor cables and the reinforcement structures may be combined. In one embodiment, the distributed sensors are selectively placed at critical monitoring locations in the circumferential direction and the sensor cables include reinforcements, such as, but not limited to, steel wire, to increase the cable and liner axial strength.

Figure 10:
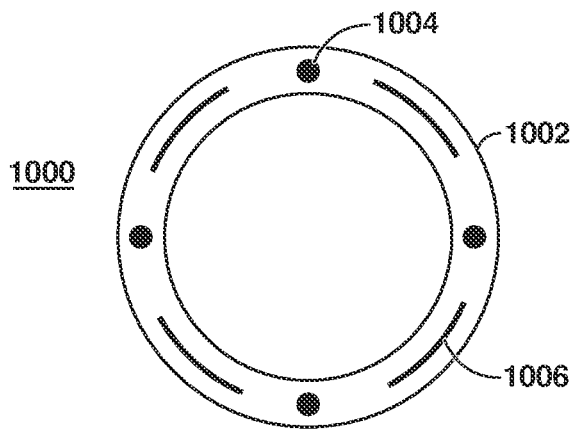
FIG. 10 is a cross-section of a pipeline liner with embedded sensor cables and tape reinforcements produced according to one embodiment of the present disclosure.

FIG. 10 is a cross-section of a pipeline liner 1000 with embedded sensor cables and tape reinforcements produced according to one embodiment of the present disclosure. The pipeline liner 1000 comprises a body portion 1002 of matrix material. Like the FIG. 9 embodiment, monitoring sensors 1004 and reinforcement structures 1006 are embedded at various points around the circumference of the body portion 902. Unlike the FIG. 9 embodiment, the reinforcement structures 1006 are in the form of tape elements.

The uniform contact between the exterior surface of the monitoring sensor and the matrix material provide for reliable sensing of various liner and/or pipeline characteristics.

While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional blocks not shown herein. While the figures illustrate various actions occurring serially, it is to be appreciated that various actions could occur in series, substantially in parallel, and/or at substantially different points in time.

Disclosed aspects may be used in hydrocarbon management activities. As used herein, "hydrocarbon management" or "managing hydrocarbons" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. The term "hydrocarbon management" is also used for the injection or storage of hydrocarbons or $CO_2$, for example the sequestration of $CO_2$, such as reservoir evaluation, development planning, and reservoir management. In one embodiment, the disclosed methodologies, techniques and systems may be used to, directly or indirectly, extract hydrocarbons from a subsurface region. Hydrocarbon extraction may then be conducted to remove hydrocarbons from the subsurface region, which may be accomplished by drilling a well using oil drilling equipment. The equipment and techniques used to drill a well and/or extract the hydrocarbons are well known by those skilled in the relevant art. Other hydrocarbon extraction activities and, more generally, other hydrocarbon management activities, may be performed according to known principles.

The following lettered paragraphs represent non-exclusive ways of describing embodiments of the present disclosure.

A. A system for producing a liner for a pipe, the system comprising: a source of material to form a body of the liner; a source of material to form a reinforcement structure in the liner; and a device that simultaneously receives the material to form the body of the liner and the material to form the reinforcement structure in the liner and produces the body of the liner with the reinforcement structure interspersed within the body of the liner in a single-step process.

A1. The system recited in paragraph A, wherein the material to form the body of the liner comprises a matrix material.

A2. The system recited in any preceding paragraph, wherein the material to form the reinforcement structure comprises a fiber-type material.

A3. The system recited in paragraph A or A1, wherein the material to form the reinforcement structure comprises glass, carbon, or high-strength polymer fiber.

A4. The system recited in paragraph A or A1, wherein the material to form the reinforcement structure comprises metallic cable or wire.

A5. The system recited in paragraph A or A1, wherein the material to form the reinforcement structure comprises high-strength tapes or strips.

A6. The system recited in any preceding paragraph, wherein the material to form the body of the liner and the material to form the reinforcement structure in the liner are incorporated into a fiber-impregnated matrix material.

A7. The system recited in any preceding paragraph, wherein the device that simultaneously receives the material to form the body of the liner and the material to form the reinforcement structure in the liner comprises a liner factory.

A8. The system recited in any of paragraphs A to A6, wherein the device that simultaneously receives the material to form the body of the liner and the material to form the reinforcement structure in the liner comprises a pultruder.

A9. The system recited in any of paragraphs A to A6, wherein the device that simultaneously receives the material to form the body of the liner and the material to form the reinforcement structure in the liner comprises an extruder and a die.

A10. The system recited in any preceding paragraph, wherein the single-step process comprises a fiber pultrusion process.

A11. The system recited in any of paragraphs A to A9, wherein the single-step process comprises a tape pultrusion process.

A12. The system recited in any of paragraphs A to A9, wherein the single-step process comprises a fiber extrusion process.

A13. The system recited in any preceding paragraph, wherein the reinforcement structure provides longitudinal reinforcement and increased axial strength of the liner.

B. A method for producing a liner for a pipe, the method comprising: providing a material to form a body of the liner; providing a material to form a reinforcement structure in the liner; and simultaneously combining the material to form the body of the liner and the material to form the reinforcement structure in the liner, so that the body of the liner is produced with the reinforcement structure interspersed within the body of the liner.

B1. The method recited in paragraph B, wherein simultaneously combining the material to form the body of the liner and the material to form the reinforcement structure in the liner comprises a fiber pultrusion process.

B2. The method recited in paragraph B, wherein simultaneously combining the material to form the body of the liner and the material to form the reinforcement structure in the liner comprises a tape pultrusion process.

B3. The method recited in paragraph B, wherein simultaneously combining the material to form the body of the liner and the material to form the reinforcement structure in the liner comprises an extrusion process.

B4. The method recited in any of paragraphs B to B3, wherein the reinforcement structure provides longitudinal reinforcement and increased axial strength of the liner.

C. A method for lining an existing pipe with a liner, the method comprising: providing a material to form a body of the liner; providing a material to form a reinforcement structure in the liner; simultaneously combining in a single-step process the material to form the body of the liner and the material to form the reinforcement structure in the liner, so that the body of the liner is produced with the reinforcement structure interspersed within the body of the liner; and pulling the liner, as it is produced, through the existing pipe.

C1. The method recited in paragraph C, wherein the liner is horizontally or vertically displaced in a loop or bends prior to insertion into the existing pipe, in order to allow different liner manufacturing and liner insertion speeds.

D. A system for producing a liner for a pipe, the system comprising: a source of material to form a body of the liner; a source of material to form a monitoring sensor in the liner; and a device that receives the material to form the body of the liner and the material to form the monitoring sensor in the liner and produces the body of the liner with the monitoring sensor embedded within the body of the liner.

D1. The system of paragraph D, wherein the sensor material is a fiber optic cable.

D2. The system of paragraph D or D1, wherein the monitoring sensor is constructed and arranged to monitor one or more liner properties selected from a group consisting of strain, temperature and acoustic vibration.

D3. The system of paragraph D or D1 or D2, wherein the device that receives the material to form the body of the liner and the material to form the monitoring sensor in the liner comprises a liner factory.

D4. The system of paragraph D or D1 or D2, wherein the device that receives the material to form the body of the liner and the material to form the monitoring sensor in the liner comprises a pultruder.

D5. The system of paragraph D or D1 or D2, wherein the device that receives the material to form the body of the liner and the material to form the monitoring sensor in the liner comprises an extruder and a die.

D6. The system recited in any paragraph D to D5, wherein the material to form the body of the liner comprises a matrix material.

D7. The system recited in any paragraph D to D6 further comprising a source of material to form a reinforcement structure in the liner, wherein the device is constructed and arranged to simultaneous receive the material to form the body of the liner, the material to form the monitoring sensor in the liner, and the material to form the reinforcement structure in the liner and produce the body of the liner with the monitoring sensor and the reinforcement structure embedded within the body of the liner.

D8. The system of paragraph D7 wherein the material to form the reinforcement structure is selected from a group consisting of glass, carbon, polymer fiber, and metallic wire.

D9. The system of paragraph D7, wherein the material to form the reinforcement structure comprises high-strength tapes or strips.

D10. The system of paragraph D7 or D8 or D9, wherein the material to form the body of the liner and the material to form the reinforcement structure in the liner are incorporated into a fiber-impregnated matrix material.

D11. The system recited in any paragraph D to D10, wherein the device simultaneously receives the material to form the body of the liner and the material to form the monitoring sensor in the liner and produces the body of the liner with the monitoring sensor embedded within the body of the liner in a single-step process.

E. A method for producing a liner for a pipe, the method comprising: providing a material to form a body of the liner; providing a material to form a monitoring sensor in the liner; and combining the material to form the body of the liner and the material to form the monitoring sensor in the liner, so that the body of the liner is produced with the monitoring sensor embedded within the body of the liner.

E1. The method of paragraph E, wherein combining the material to form the body of the liner and the material to form the monitoring sensor in the liner comprises a process selected from the group of fiber pultrusion, tape pultrusion, and extrusion.

E2. The method of paragraph E or E1, wherein the monitoring sensor is constructed and arranged to monitor one or more liner properties selected from a group consisting of strain, temperature and acoustic vibration.

E3. The method of paragraph E or E1 or E2, wherein the sensor material is a fiber optic cable.

E4. The method recited in any paragraph E to E3 further comprising providing a material to form a reinforcement structure in the liner, wherein the material to form a reinforcement structure is simultaneously combined with the material to form the body of the liner and the material to form the monitoring sensor in the liner.

E5. The method of paragraph E4, wherein the material to form the reinforcement structure is selected from a group consisting of glass, carbon, polymer fiber, and metallic wire.

F. A method for lining an existing pipe with a liner, the method comprising: providing a material to form a body of the liner; providing a material to form a monitoring sensor in the liner; simultaneously combining in a single-step process the material to form the body of the liner and the material to form the monitoring sensor in the liner such that the body of the liner is produced with the monitoring sensor embedded within the body of the liner; and pulling the liner, as it is produced, through the existing pipe.

F1. The method of paragraph F further comprising providing a material to form a reinforcement structure, wherein the material to form the reinforcement structure is combined with the material to form the body of the liner and the material to form the monitoring sensor in the liner during the single-step process.

F2. The method of paragraph F or F1, wherein the liner is horizontally or vertically displaced in a loop or bends prior to insertion into the existing pipe, in order to allow different liner manufacturing and liner insertion speeds.

G. A liner for lining and monitoring a pipeline comprising: a body portion having a layer of matrix material, the layer having an inner surface and an outer surface; and a monitoring sensor embedded within the body portion and positioned between the inner surface and the outer surface layer.

G1. The liner of paragraph G, wherein the monitoring sensor is a fiber optic cable.

G2. The liner of paragraph G or G1, wherein the monitoring sensor is constructed and arranged to monitor one or more liner properties selected from a group consisting of strain, temperature and acoustic vibration.

G3. The liner of paragraph G or G1 or G2 further comprising a reinforcement structure embedded within the body portion and positioned between the inner surface and outer surface of the layer.

G4. The liner of paragraph G3, wherein the reinforcement structure is composed of a material is selected from a group consisting of glass, carbon, polymer fiber, metallic wire, and high-strength tapes.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open ended so as to include, optionally, multiple such elements.

What is claimed is:

1. A system for producing a liner for a pipe, the system comprising:
    a source of material to form a body of the liner;
    a source of material to form a monitoring sensor in the liner; and
    a device that simultaneously receives the material to form the body of the liner and the material to form the monitoring sensor in the liner and produces the body of the liner with the monitoring sensor embedded within the body of the liner in a single-step process such that the body of the liner is composed of a single layer of material with the monitoring sensor placed between an inner surface and an outer surface of the single layer.

2. The system of claim 1, wherein the sensor material is a fiber optic cable.

3. The system of claim 1, wherein the monitoring sensor is constructed and arranged to monitor one or more liner properties selected from a group consisting of strain, temperature and acoustic vibration.

4. The system of claim 1, wherein the device that receives the material to form the body of the liner and the material to form the monitoring sensor in the liner comprises a liner factory.

5. The system of claim 1, wherein the device that receives the material to form the body of the liner and the material to form the monitoring sensor in the liner comprises a pultruder.

6. The system of claim 1, wherein the device that receives the material to form the body of the liner and the material to form the monitoring sensor in the liner comprises an extruder and a die.

7. The system of claim 1, wherein the material to form the body of the liner comprises a matrix material.

8. The system of claim 1 further comprising a source of material to form a reinforcement structure in the liner, wherein the device is constructed and arranged to simultaneous receive the material to form the body of the liner, the material to form the monitoring sensor in the liner, and the material to form the reinforcement structure in the liner and produce the body of the liner with the monitoring sensor and the reinforcement structure embedded within the body of the liner in the single-step process such that the reinforcement structure is placed between the inner surface and the outer surface of the single layer.

9. The system of claim 8, wherein the material to form the reinforcement structure is selected from a group consisting of glass, carbon, polymer fiber, and metallic wire.

10. The system of claim 8, wherein the material to form the reinforcement structure comprises high-strength tapes or strips.

11. The system of claim 8, wherein the material to form the body of the liner and the material to form the reinforcement structure in the liner are incorporated into a fiber-impregnated matrix material.

12. A method for producing a liner for a pipe, the method comprising:
provideing a material to form a body of the liner;
providing a material to form a monitoring sensor in the liner; and
simultaneously combining the material to form the body of the liner and the material to form the monitoring sensor in the liner, so that the body of the liner is produced with the monitoring sensor embedded within the body of the liner in a single-step process such that the body of the liner is composed of a single layer of material with the monitoring sensor placed between an inner surface and an outer surface of the single layer.

13. The method of claim 12, wherein combining the material to form the body of the liner and the material to form the monitoring sensor in the liner comprises a process selected from the group of fiber pultrusion, tape pultrusion, and extrusion.

14. The method of claim 12, wherein the monitoring sensor is constructed and arranged to monitor one or more liner properties selected from a group consisting of strain, temperature and acoustic vibration.

15. The method of claim 12, wherein the sensor material is a fiber optic cable.

16. The method of claim 12 further comprising providing a material to form a reinforcement structure in the liner, wherein the material to form a reinforcement structure is simultaneously combined with the material to form the body of the liner and the material to form the monitoring sensor in the liner in the single-step process such that the reinforcement structure is placed between the inner surface and the outer surface of the single layer.

17. The method of claim 16, wherein the material to form the reinforcement structure is selected from a group consisting of glass, carbon, polymer fiber, and metallic wire.

18. A method for lining an existing pipe with a liner, the method comprising:
providing a material to form a body of the liner;
providing a material to form a monitoring sensor in the liner;
simultaneously combining in a single-step process the material to form the body of the liner and the material to form the monitoring sensor in the liner such that the body of the liner is produced with the monitoring sensor embedded within the body of the liner and the body of the liner is composed of a single layer of material with the monitoring sensor placed between an inner surface and an outer surface of the single layer; and
pulling the liner, as it is produced, through the existing pipe.

19. The method of claim 18 further comprising providing a material to form a reinforcement structure, wherein the material to form the reinforcement structure is simultaneously combined with the material to form the body of the liner and the material to form the monitoring sensor in the liner during the single-step process such that the reinforcement structure is placed between the inner surface and the outer surface of the single layer.

20. The method of claim 19, wherein the liner is horizontally or vertically displaced in a loop or bends prior to insertion into the existing pipe, in order to allow different liner manufacturing and liner insertion speeds.

21. A liner for lining and monitoring a pipeline comprising:
a liner body portion having a single layer of matrix material, the layer having an inner surface and an outer surface; and
a monitoring sensor embedded within the body portion and positioned between the inner surface and the outer surface of the layer such that there is uniform contact between the outer surface of the monitoring sensor and the body portion.

22. The liner of claim 21, wherein the monitoring sensor is a fiber optic cable.

23. The liner of claim 21, wherein the monitoring sensor is constructed and arranged to monitor one or more liner properties selected from a group consisting of strain, temperature and acoustic vibration.

24. The liner of claim 21 further comprising a reinforcement structure embedded within the body portion and positioned between the inner surface and outer surface of the layer.

25. The liner of claim 24, wherein the reinforcement structure is composed of a material is selected from a group consisting of glass, carbon, polymer fiber, metallic wire, and high-strength tapes.

26. The liner of claim 24, wherein the reinforcement structure is positioned longitudinally within the layer and extends continuously along the length of the liner without any circumferentially aligned reinforcement material.

* * * * *